United States Patent [19]

Jansen

[11] Patent Number: 5,397,116

[45] Date of Patent: Mar. 14, 1995

[54] INTERLOCKING WORK HOLDER

[76] Inventor: John L. Jansen, 1424 E. Broadway, Mt. Vernon, Wash. 98273

[21] Appl. No.: 818,742

[22] Filed: Jan. 7, 1992

Related U.S. Application Data

[63] Continuation of Ser. No. 576,373, Aug. 31, 1990, abandoned.

[51] Int. Cl.6 .............................................. B25B 1/00
[52] U.S. Cl. ........................................ 269/45; 269/93; 269/900; 269/88
[58] Field of Search ............... 446/114, 122, 124, 125; 269/49, 900, 91–94, 88, 45, 63, 64, 99, 100

[56] References Cited

U.S. PATENT DOCUMENTS

| 251,903 | 1/1882 | Lewis | 446/109 |
|---|---|---|---|
| 1,954,708 | 4/1934 | Mass | 269/900 |
| 2,877,815 | 3/1959 | Fonken | 269/93 |
| 3,224,136 | 12/1965 | Moryl | 446/126 |
| 4,704,313 | 11/1987 | Maier | 446/116 |
| 4,740,188 | 4/1988 | Coster | 446/114 |
| 4,753,425 | 6/1988 | Yang | 269/88 |
| 4,867,427 | 9/1989 | Cunningham | 269/900 |
| 4,871,106 | 10/1989 | Wharff | 269/900 |
| 4,886,257 | 12/1989 | Witte | 269/900 |

FOREIGN PATENT DOCUMENTS

| 907326 | 8/1972 | Canada | 446/114 |

Primary Examiner—Robert C. Watson
Attorney, Agent, or Firm—Russell W. Illich

[57] ABSTRACT

A work holder is provided which comprises a work surface having a pattern of apertures across its entire surface. The apertures allow a conventional clamp to secure any work piece to the work surface at any point on the surface. The apertures are circular in shape and of a dimension such that a conventional clamp will not slip from the board. Radially extended flutes are connected to the circular apertures to allow the clamps to be fully extended across a work piece and be essentially locked to the work surface. Half apertures at the edges of the work surface allow the work surfaces to interlock with one another. The interlocking half apertures in combination with their radial flutes allow the work surface to be set up in a wide variety of configurations.

3 Claims, 1 Drawing Sheet

INTERLOCKING WORK HOLDER

This application is a continuation of Ser. No. 07/576,373, filed Aug. 31, 1990 now abandoned.

BACKGROUND OF THE INVENTION

The present invention relates to a work holder capable of holding many different types of materials in a variety of configurations by one or more clamps. In the prior art of work holders there have been many attempts at designing a work surface allowing a wide variety of materials to be clamped thereto. Unfortunately, none of the work holders currently available in the market are versatile and efficient enough for a wide range of carpentry and construction work. There has been a need within the construction industry for a workholder that is versatile and simple in design.

Several work holders within the prior art include work surfaces with various grooves, holes and/or slots for accomodating various clamp devices. The clamps are used to secure various work pieces to the work surface. There are many disadvantages to these prior art work surfaces. First, they generally are fit to allow the work pieces to be clamped in a single position and do not offer flexibility to clamp the work piece in any configuration. Second, they often are intended to be used with specialized clamps or tools. If the user already has tools and clamps, this type of work holder becomes impractical. Third, the work surfaces must be supported by some type of framework which are often bulky and expensive.

The present invention resolves all of the drawbacks noted above and also includes many new uses, features and advantages that prior art work holders have never had.

SUMMARY OF THE INVENTION

It is an object of this invention to provide a work surface that can be used with conventional clamps for holding a wide variety of work pieces in a variety of positions and configurations.

Another object the invention is to provide a work surface that can be made of simple and inexpensive materials and which would not require expensive support frames.

It is a further object of the invention to provide a work surface that has an interlocking design such that the work surface itself may be configured in a variety of positions.

Other objects of the invention will be apparent hereinafter from the specification and from the recital of the appended claims, particularly when read in conjunction with the accompany drawings.

The present invention comprises a work surface having a repetitive pattern of apertures across its entire surface. The apertures allow a conventional clamp to clamp any work piece to the work surface at any point on the surface. The apertures are circular in shape and of a dimension such that a conventional clamp will not slip from the board. Radially extended flutes are connected to the circular apertures to allow the clamps to be fully extended across a work piece and be essentially locked to the work surface. Half apertures at the edges of the work surface allow the work surfaces to interlock with one another. The interlocking half apertures in combination with their radial flutes allow the work surface to be set up in a wide variety of configurations. The work surface is simple in design and may be made from many different types of materials.

DETAILED DESCRIPTION OF THE INVENTION

Figure 1:
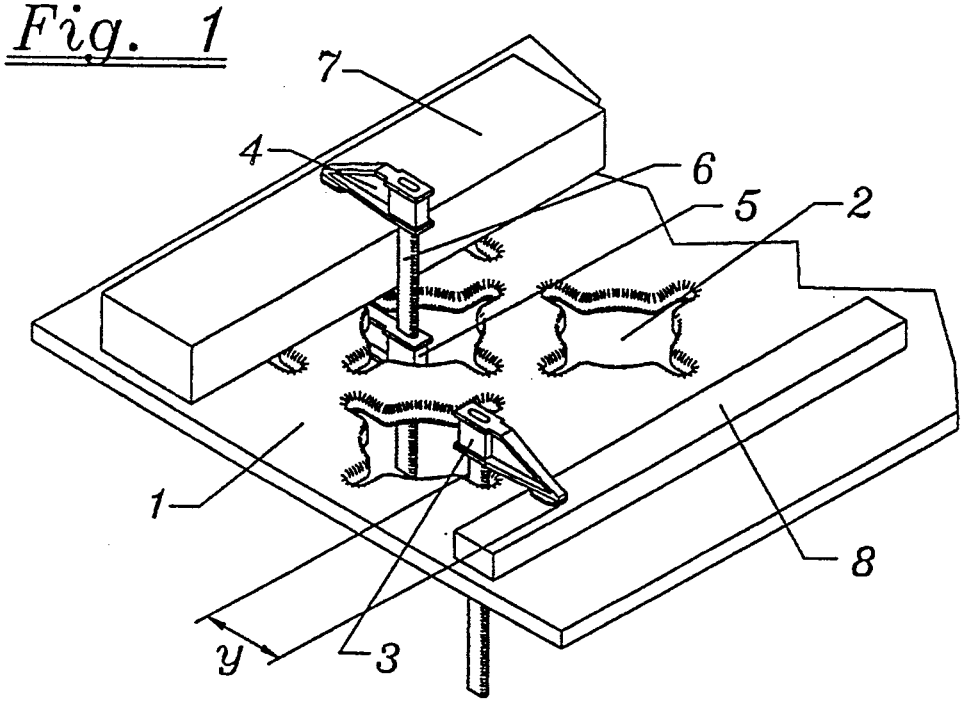
FIG. 1 shows a perspective view of the work surface of the present invention in a horizontal configuration in use with conventional clamps.

FIG. 1 shows a preferred embodiment of the interlocking work surface of the present invention. The work surface 1 has a pattern of apertures 2 that stretch across the entire width and length of the board. The standard pattern associated with this embodiment involves placing the apertures in a staggered configuration such that for every five apertures there are four at each corner and one within the center. The apertures 2 are of such a shape such that a conventional clamp 3 may be easily used with the surface 1. A conventional clamp generally includes an upper jaw 4, a lower jaw 5, a vertical adjustable support 6, and a means for tightening the lower jaw relative to the upper jaw (not shown). The means for tightening the lower jaw usually includes a threaded member extending through the lower jaw.

The clamp at the upper left corner of FIG. 1 is shown clamping a work piece 7 in a tangential configuration. In this clamp configuration the vertical support 6 of the clamp lies adjacent to the perimeter of the aperture 2. It should be noted that the 360° nature of the aperture allows the work piece 7 to be clamped at any angle relative to the surface 1. The vertical support can always be positioned to bear against a point on the perimeter of the aperture in this tangential configuration. This allows for greater stability of the clamp relative to the work surface 1.

Figure 2:
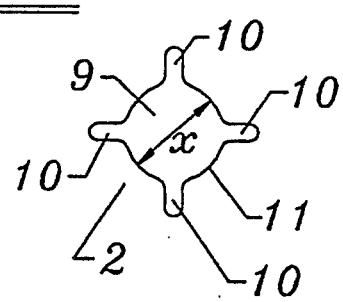
FIG. 2 shows a detailed plan view of one aperture of the work surface of FIG. 1.

FIG. 2 shows the detailed shape of the aperture 2. The aperture 2 includes a central circular opening 9 with radially extended flutes 10 leading from four sides of the opening 9. The perimeter 11 of the central opening gives the clamp a bearing surface in its first configuration for clamping a work piece at any angle relative to the work surface 1. The flutes 10 extend perpendicularly out from the perimeter 11 at the 90°, 180°, 270° and 360° points on the central opening. The flutes allow for the clamps to be effectively locked into place on the board when the work piece is arranged in a perpendicular configuration on the work surface 1.

The lower right clamp of FIG. 1 shows the perpendicular configuration where the clamp is seated within a flute of the aperture 2. In this configuration, the clamp is held on three sides by three surfaces of the flute while clamping the work piece 8. The clamp can move in only one direction (backwards out of the flute) while locked in the flute in this perpendicular configuration. This arrangement locks the clamp on the board and prevents the clamp from being dislodged from its position if the surface 1 or clamp 3 is accidentally bumped or vibrated.

The unique shape of the aperture 2, as shown in FIGS. 1 and 2, gives the board its versatility in clamping any work piece in a secure or locked configuation. Another unique aspect of the shape of the aperture 2 is its dimensions relative to the clamp 3. The upper jaw 4 of the clamp has a minimum width of "y" as shown in FIG. 1. "Y" is the width from the back of the vertical support 6 to the tip of the upper jaw 4. FIG. 2 shows the central opening 9, which is circular in shape, having a diameter of "x". The aperture 2 is dimensioned such that $x<y$ for a standard sized clamp. This unique dimensioning of the aperture gives the work surface even greater versatility in its use with thin sheets of material, plural work pieces of the same dimension, and work pieces with openings. The conventional clamp 3 may be used such that both ends of the upper jaw 4 can bear on two different pieces or two different locations on the same work piece. This feature allows for better clamping of materials on the board and can reduce the total number of clamps needed when working with the work surface of the present invention. None of the prior art work holders feature this added versatility of using both ends of a clamp to bear on a work piece.

The apertures 2 shown in FIG. 1 have rounded edges. These edges could alternatively be sharp edges or rounded to any degree based on the user's needs for the work holder.

Figure 3:
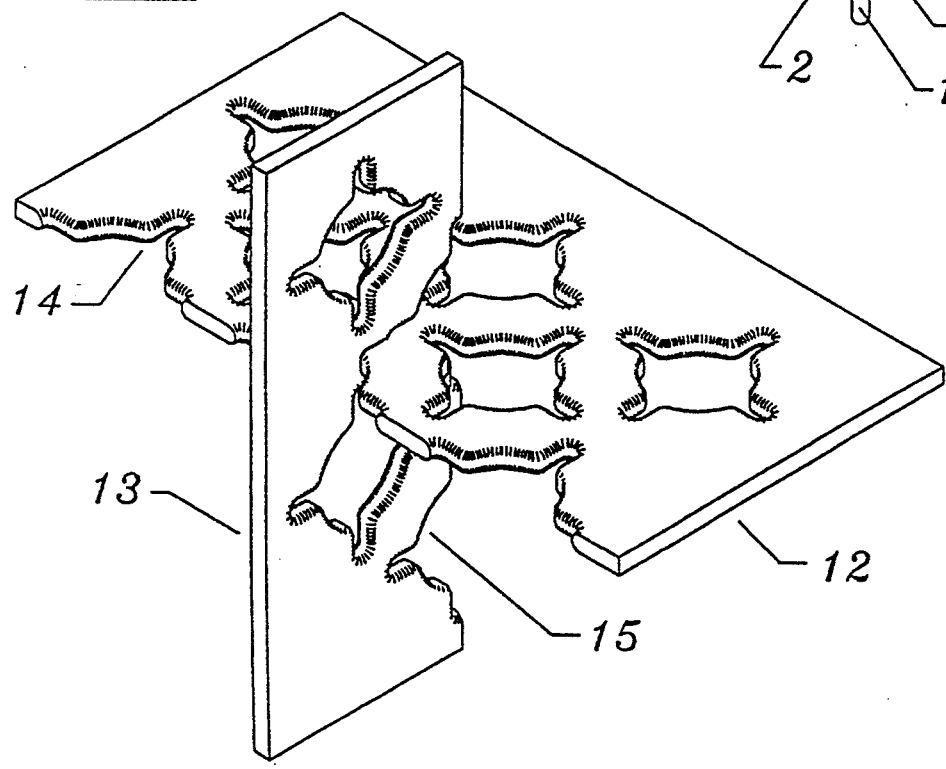
FIG. 3 shows a perspective view of the work surface in an interlocking perpendicular configuration.

FIG. 3 shows the interlocking feature of the work surface of the present invention. The horizontal work surface 12 is shown with half apertures 14 along one edge of the surface 12. The vertical work surface 13 similarly includes half apertures 15 along one of its edges. The shape of the aperture 2 is such that the half apertures 14 and 15 may interlock with one another within their respective flutes. The interlocking connection is a strong connection which allows the work surfaces 12 and 13 to be arranged in a number of different positions. Thus, in assembling a work holder on a remote site, one does not need to bring a complex, bulky and expensive framework on which to set the work surface. With the present invention, one need only cut four legs from the edges of the work surface and arrange them in a perpendicular interlocked fashion as shown by FIG. 3.

It should be appreciated that the interlocking feature of the work surface could be used in making shelves, conventional tables, decorative stands and many other types of furniture. The work surface may be made of any material. The apertures may be cut and rounded from a material such as particle board or cast in a form using metal or plastic. When molding the work surface, the broad pattern of apertures allows the surface to use much less material than conventional work holders. By using less material, the work surface can be constructed at a lower overall cost to the consumer.

It should be apparent that many modifications could be made to the interlocking work holder which would still be encompassed within the spirit of the present invention. It is intended that all such modifications may fall within the scope of the appended claims.

What is claimed is:

1. A pair of interlocking work surfaces comprising:
    a first surface, said first surface comprising a plurality of apertures arranged in a pattern, said apertures comprising a central circular portion and and at least one linear extension extending out as a radial from the center of said circular portion;
    a second surface, said second surface comprising a plurality of apertures arranged in a pattern, said apertures comprising a central circular portion and at least one linear extension extending out as a radial from the center of said circular portion;
    means for removably interlocking said first surface at an angle to said second surface;
    said interlocking means comprises a first half-aperture along one edge of said first surface and a second half-aperture along one edge of said second surface, said first and second half-apertures are shaped as open notches comprising a semi-circular central portion, and at least one linear extension spaced along the perimeter of said semi-circular portion, said linear extension of said first half-aperture capable of mating with said linear extension of said second half-aperture to lock said first surface to said second surface at an angle thereto.

2. A work holder in combination with a clamp for allowing the clamp to secure a work piece to the holder at any angle comprising:
    a flat surface having a plurality of uniform apertures, said apertures having means for allowing the clamp to be positioned at any angle relative to said surface, said apertures further including means for providing a bearing surface for the clamp when positioned at any angle relative to said surface;
    said apertures having a circular portion defined by an inner perimeter of a circular shape;
    each of said apertures having a plurality of linear extensions extending radially outwardly from said circular portion and extending normal to said perimeter of said circular portion;
    said apertures are arranged in a staggered pattern on said flat surface.

3. A work holder in combination with a clamp for allowing the clamp to secure a work piece to the holder at any angle and at any position relative to said work holder, comprising:
    a flat surface having a plurality of uniform apertures, the clamp having a vertical portion extending through one of said uniform apertures, said vertical portion of the clamp having a dimension substantially smaller than the diameter of said uniform apertures;
    means for allowing the clamp to be positioned within one of said apertures at any angle relative to said surface;
    means for allowing said vertical portion of the clamp to be positioned at any one of a plurality of positions along a radius of said one uniform aperture;
    and, means for providing a bearing surface for the clamp when positioned at any angle relative to said surface.

* * * * *